United States Patent
Foster et al.

(10) Patent No.: US 12,228,382 B2
(45) Date of Patent: Feb. 18, 2025

(54) PROPULSIONLESS HYPERSONIC DUAL ROLE MUNITION

(71) Applicant: The Boeing Company, Chicago, IL (US)

(72) Inventors: John K. Foster, St. Peters, MO (US); Ryan Binkholder, Webster Groves, MO (US); Thaddeus Jakubowski, Jr., St. Charles, MO (US)

(73) Assignee: The Boeing Company, Arlington, VA (US)

( * ) Notice: Subject to any disclaimer, the term of this patent is extended or adjusted under 35 U.S.C. 154(b) by 552 days.

(21) Appl. No.: 17/727,924

(22) Filed: Apr. 25, 2022

(65) Prior Publication Data

US 2023/0012398 A1 Jan. 12, 2023

Related U.S. Application Data

(60) Provisional application No. 63/217,598, filed on Jul. 1, 2021.

(51) Int. Cl.
*F42B 10/46* (2006.01)
*B64C 30/00* (2006.01)
*B64D 1/06* (2006.01)
*F42B 10/64* (2006.01)

(52) U.S. Cl.
CPC .............. *F42B 10/46* (2013.01); *B64C 30/00* (2013.01); *B64D 1/06* (2013.01); *F42B 10/64* (2013.01)

(58) Field of Classification Search
CPC .......... F42B 10/20; F42B 10/46; F42B 10/64; B64C 30/00
See application file for complete search history.

(56) References Cited

U.S. PATENT DOCUMENTS

| | | | | |
|---|---|---|---|---|
| 2,937,573 | A * | 5/1960 | Gantschnigg | B64D 1/04 89/1.51 |
| 5,457,471 | A * | 10/1995 | Epperson, Jr. | H01Q 1/42 244/159.1 |
| 7,834,300 | B2 * | 11/2010 | Zemany | F41G 7/226 102/501 |
| 10,030,952 | B1 * | 7/2018 | Stofko | F42B 10/46 |
| 2013/0255527 | A1 * | 10/2013 | Levy | F42B 10/46 102/517 |

* cited by examiner

*Primary Examiner* — Nicholas McFall
(74) *Attorney, Agent, or Firm* — Alleman Hall & Tuttle LLP (57) ABSTRACT

A propulsionless munition configured to be launched from a hypersonic aerial includes a munition body that is free of any propulsion system for producing thrust. The munition body includes a forward section including a radome assembly and an aft section including a control system. The radome assembly includes a nose radome and a frangible radome cover disposed over the nose radome for shielding the nose radome from high temperatures resulting from aerodynamic heating at hypersonic speeds. The frangible radome cover is detachable from the nose radome upon detection by the control system of a predetermined threshold comprising at least one of a predetermined speed, a predetermined altitude, and a predetermined temperature.

20 Claims, 6 Drawing Sheets

PROPULSIONLESS HYPERSONIC DUAL ROLE MUNITION

CROSS-REFERENCE TO RELATED APPLICATIONS

This application claims the benefit of U.S. Provisional Patent Application Ser. No. 63/217,598 filed on Jul. 1, 2021, the disclosure of which is hereby incorporated by reference in its entirety.

FIELD

The field relates generally to munitions for releasing from aerial vehicles, and more specifically, to hypersonic munitions that are free of a propulsion system and can be used for air-to-air and air-to-ground targeting.

BACKGROUND

In aerial vehicle design, weight and available munitions storage are of the utmost importance. Many known munition systems are meant to be fired from subsonic or supersonic aerial vehicles. Such munitions require a propulsion system to reach their desired target once released from the aerial vehicle. For example, air-to-air munitions launched from conventional supersonic platforms require a propulsion system to accelerate to high supersonic speeds when engaging targets. Additionally, propulsion systems on air-to-ground munitions are used to extend range and increase speed to decrease the flight time to the target. However, including a propulsion system in a munition increases both the weight and the volume of the munition for a given kinetic payload size.

Furthermore, many known munitions are designed for either air-to-air or air-to-ground targeting, which requires a vehicle to store both types of munitions at the same time. However, carrying separate designated air-to-air or air-to-ground munitions can decrease mission effectiveness.

BRIEF DESCRIPTION

A propulsionless munition configured to be launched from a hypersonic aerial vehicle is provided. The propulsionless munition includes a munition body that is free of any propulsion system for producing thrust. The munition body includes a forward section including a radome assembly and an aft section including a control system. The radome assembly includes a nose radome and a frangible radome cover disposed over the nose radome for shielding the nose radome from high temperatures resulting from aerodynamic heating at hypersonic speeds. The frangible radome cover is detachable from the nose radome upon detection by the control system of a predetermined threshold comprising at least one of a predetermined speed, a predetermined altitude, and a predetermined temperature.

A method of launching a propulsionless munition from a hypersonic aerial vehicle includes ejecting the munition from the aerial vehicle. The munition includes a munition body that is free of any propulsion system for producing thrust such that the munition body is incapable of producing active propulsion for imparting thrust to the munition. The method also includes sensing at least one of a temperature, a speed, and an altitude of the munition body after ejection from the aerial vehicle. The method further includes releasing a frangible radome cover that is disposed over a nose radome and positioned in a forward section of the munition body upon detection by a control system that at least one of the sensed temperature, speed, and altitude has reached at least one of a predetermined speed, a predetermined altitude, and a predetermined temperature. The radome cover shields the nose radome from high temperatures resulting from aerodynamic heating at hypersonic speeds.

A propulsionless munition configured to be launched from a hypersonic aerial vehicle is provided. The propulsionless munition includes a munition body that is free of any propulsion system for producing thrust. The munition body includes a forward section including a radome assembly and an aft section including a control system and a deployable tailcone assembly for deployment from the aft section upon launch of the munition, wherein the tailcone assembly reduces aerodynamic drag caused by airflow over a blunt aft end of the munition. The tailcone assembly includes a tailcone housing connected to the munition body and defining a cavity, a deployable tailcone attached to the tail housing and positioned within the cavity in a stored configuration, and a pressure vessel positioned within the housing and configured to deploy the tailcone to a deployed configuration upon receiving a signal from the control system indicative of a predetermined parameter.

The features, functions, and advantages that have been discussed can be achieved independently in various embodiments or may be combined in yet other embodiments, further details of which can be seen with reference to the following description and drawings.

DETAILED DESCRIPTION

The implementations described herein relate to aerial vehicles, and more specifically, to hypersonic aerial vehicles that are free of a propulsion system and can be used for air-to-air and air-to-ground targeting. The munition delivers kinetic energy to a target without requiring an independent propulsion system. Specifically, the munition is launched from the aerial vehicle at a sufficient hypersonic speed and altitude so that the aerial vehicle imparts a hypersonic initial speed to the munition such that the munition does not require a propulsion system. The release of the munition at hypersonic speeds results in a very high initial energy that allows the munition to perform both air-to-air and air-to-ground missions without the need for additional propulsion. The initial hypersonic speed of munition provides sufficient energy to not require acceleration to meet or exceed the speed of an air-to-air mission target. Further, the high initial energy provides sufficient range for air-to-ground engagement. Additionally, the ability of the munition to be used for both air-to-air and air-to-ground targeting improves mission effectiveness.

Figure 1:
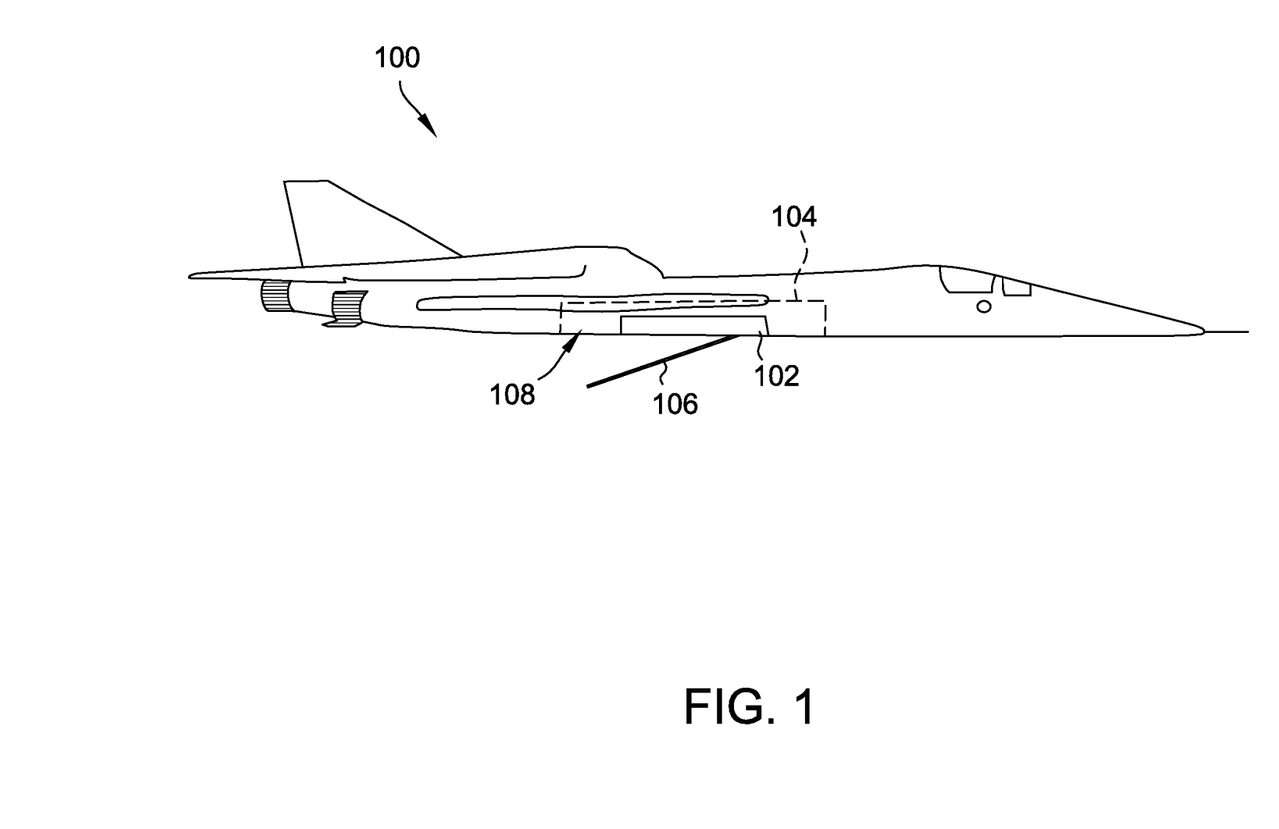
FIG. 1 is a side view of an example hypersonic aerial vehicle.

FIG. 1 is a side view of an example airborne hypersonic aerial vehicle 100. In the example implementation, aerial vehicle 100 is a hypersonic vehicle capable of hypersonic flight and can release an example hypersonic propulsionless munition 102. Vehicle 100 includes a munitions bay 104 that houses munition 102 therein and a munitions door 106 that opens to release munition 102 from vehicle 100. A launch system 108 is activated by the vehicle pilot and is operational to release munition 102 from vehicle 100.

Figure 2:
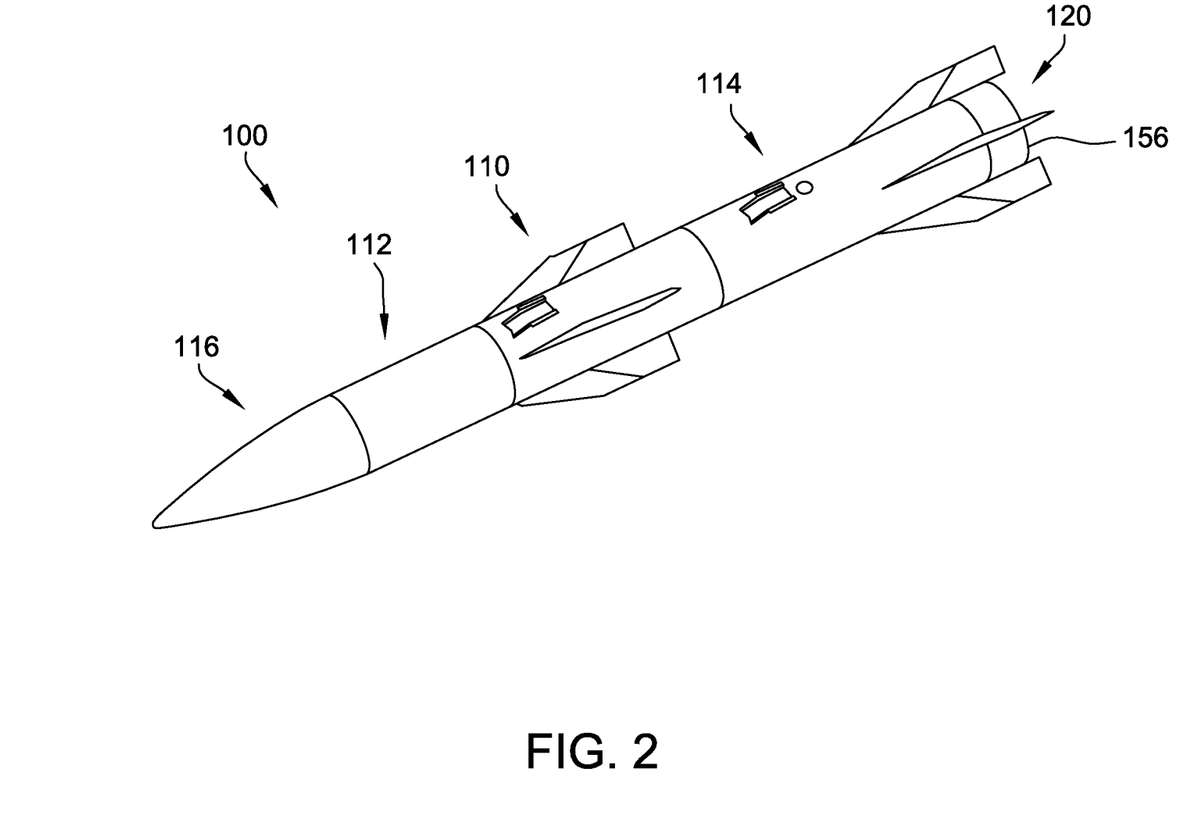
FIG. 2 is a perspective view of a hypersonic munition that may be released from the aerial vehicle shown in FIG. 1.
Figure 3:
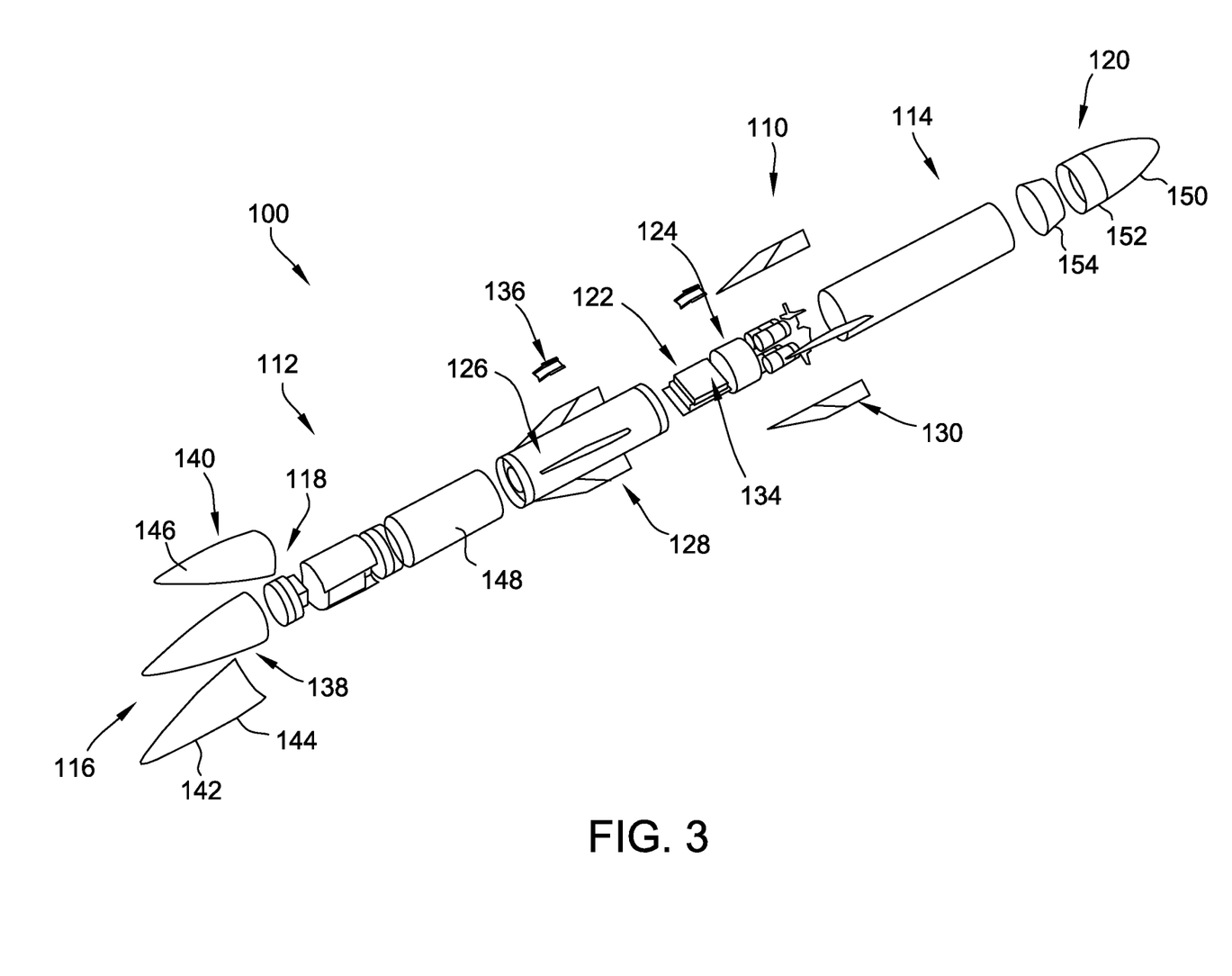
FIG. 3 is an exploded view of the hypersonic munition shown in FIG. 2.

FIG. 2 is a perspective view of hypersonic munition 102 that may be released from aerial vehicle 100 (shown in FIG. 1). FIG. 3 is an exploded view of hypersonic munition 102. In the example implementation, munition 102 is a hypersonic propulsionless munition that delivers kinetic energy to a target without requiring an independent propulsion system. As shown in FIG. 2, munition 102 includes a munition body 110, which includes a forward section 112 and an aft section 114. As described herein, munition body 110 includes a generally cylindrical configuration and is free of any propulsion system for producing thrust. Specifically, munition 102 is launched from vehicle 100 at a sufficient hypersonic speed and altitude so that vehicle 100 imparts a hypersonic initial speed to munition 102 such that munition 102 does not require a propulsion system. The release of munition 102 at hypersonic speeds results in a very high initial energy that allows munition 102 to perform both air-to-air and air-to-ground missions without the need for additional propulsion, such as a rocket motor. The initial hypersonic speed of munition provides sufficient energy to not require acceleration to meet or exceed the speed of an air-to-air mission target. Further, the high initial energy provides sufficient range for air-to-ground engagement. Being absent any propulsion system, munition 102 is incapable of producing active propulsion for imparting thrust to the munition 102.

In the example implementation, forward section 112 includes a radome assembly 116 and a targeting system 118. Aft section 114 includes a tailcone assembly 120 and a control system 122 with an electrical power source 124. Main body 110 of munition 102 includes a payload 126, a plurality of stationary fins 128, and a plurality of movable fins 130 with a fin actuation system 132. Guidance controls and avionics system 134 is also positioned in aft section 114 but could be positioned at any location within munition body 110. A pair of rail lugs 136 are connected to munition body 110 for connecting munition 102 to launching system 108 of vehicle 100.

As shown in FIG. 3, radome assembly 116 includes a nose radome 138 and a frangible radome cover 140 disposed over the radome 138 for shielding the radome 138 from high temperatures resulting from aerodynamic heating at hypersonic speeds. Radome 138 is designed, configured, and constructed to protect targeting system 118 from environmental conditions (e.g., wind, rain, dust, moisture, heat, etc.) as munition 102 travels through the air at a high velocity toward an intended target destination. In the example implementation, frangible radome cover 140 is detachable from the radome 138 upon detection by control system 122 of a predetermined threshold including at least one of a predetermined speed, a predetermined altitude, and a predetermined temperature. Radome cover 140 has a shape corresponding to the radome 138 and is detachable by a detonation cord 142 that is activated by control system 122 upon detection by control system 122 of the predetermined threshold.

Radome cover 140 includes an inner layer 144 positioned around radome 138 and an outer layer 146 coupled to an exterior of inner layer 144. Specifically, inner layer 144 extends around the entire circumference of radome 138, and outer layer extends around the entire circumference of inner layer 144. In the example embodiment, outer layer 146 is formed from a material that exhibits physical properties (e.g., strength, toughness, hardness, etc.) sufficient to withstand the forces and conditions to which outer layer 146 will be exposed during flight of munition 102 at the temperatures to which outer layer 146 may be heated during flight of munition 102. For example, outer layer 146 may be made from a ceramic material. More specifically, outer layer 146 may be made from a ceramic matrix composite (CMC) material configured to withstand high temperatures resulting from high speed air travel. CMC materials are a subgroup of composite materials as well as a subgroup of technical ceramics. They consist of ceramic fibers embedded in a ceramic matrix, thus forming a ceramic fiber reinforced ceramic (CFRC) material. The matrix and fibers can consist of any ceramic material, whereby carbon and carbon fibers can also be considered a ceramic material. Carbon (C), special silicon carbide (SiC), alumina (Al2O3) and mullite (Al2O3-SiO2) fibers are most commonly used for CMC materials. The matrix materials are usually the same, that is C, SiC, alumina and mullite. CMC materials overcome the major disadvantages of conventional technical ceramics, namely brittle failure, and low fracture toughness, and limited thermal shock resistance. Therefore, their applications are in fields requiring reliability at high-temperatures (beyond the capability of metals) and resistance to corrosion and wear. In some implementations, outer layer 146 is configured to erode away and become separated from inner layer 144 during flight of munition 102.

In the example implementation, inner layer 144 is formed from a metallic material is designed to be detached from radome 138 by activation of detonation cord 142 that circumscribes at least a portion of inner layer 144. As described herein, radome cover 140, and specifically inner layer 144, is detachable from radome 138 by detonation cord 142 that is activated by control system 122 upon detection by control system 122 of the predetermined threshold including at least one of a predetermined speed, a predetermined altitude, and a predetermined temperature. Munition 102 includes at least one sensor 148 communicatively coupled to control system 122 for monitoring at least one of temperature and altitude of munition 102. In one implementation, sensor 148 monitors a temperature of an outer surface of munition 102, wherein the sensed temperature is indicative of a speed of munition 102. Control system 122 determines, based on the sensed temperature, when munition 102 has decelerated to less than a predetermined speed at which to cause frangible radome cover 140 to be detached from munition 102. More specifically, in one implementation, the predetermined speed at which the control system is configured to cause the frangible radome cover to detach is not more than 75 percent of the initial speed on munition 102 after ejection from vehicle 100. In another implementation, the predetermined threshold to cause detachment of inner layer 144 from munition 102 is one of a predetermined temperature (not indicative of speed) and a predetermined altitude. Similarly, upon launch from the hypersonic vehicle 100, control system 122 monitors at least one of the temperature and the altitude of munition 102 via sensor 148 and causes frangible radome cover 140 to detach from munition 102 upon detecting at least one of a temperature less than the predetermined temperature and an altitude less than the predetermined altitude.

As shown in FIG. 3, munition body 110 of munition 102 includes payload 126 and stationary fins 128. Munition 102 is operable to deliver payload 126 to a target with a high amount of kinetic energy to destroy the target. In some implementations, payload 126 may be activated within a predetermined proximity of the target to impart additional kinetic energy. In such implementations, payload 126 is in a "safed" configuration when munition 102 is launched from vehicle 100 and is not "unsafed" until munition 102 is a predetermined distance from vehicle 100.

Aftward of payload 126 is aft section 114 having control system 122, avionics system 134, movable fins 130, and fin actuation system 132. In the example implementation, avionics system 134 is activated upon the release of radome cover 140 to acquire the target and communicate with control system 122, targeting system 118, and fin actuation system 132 to control moveable fins 130 and guide munition 102 to the target.

Aft section 114 further includes tailcone assembly 120 including a deployable tailcone 150, a tailcone housing 152, and a collar 154 for connecting tailcone assembly 120 to munition body 110. In the example implementation, tailcone 150 is deployed from housing 152 shortly after munition 102 is released from vehicle 100. In a deployed configuration, tailcone 150 reduces aerodynamic drag caused by the airflow over a blunt aft end 156 of munition 102. Specifically, tailcone 150 acts as a sealed pressurized air bag that reduces vortex and eddy current formation at end 156 and allows for a more laminar boundary layer as the airflow transitions from end 156 to tailcone 150. Such reduction in drag increases the stability and range of munition 102.

Figure 4:
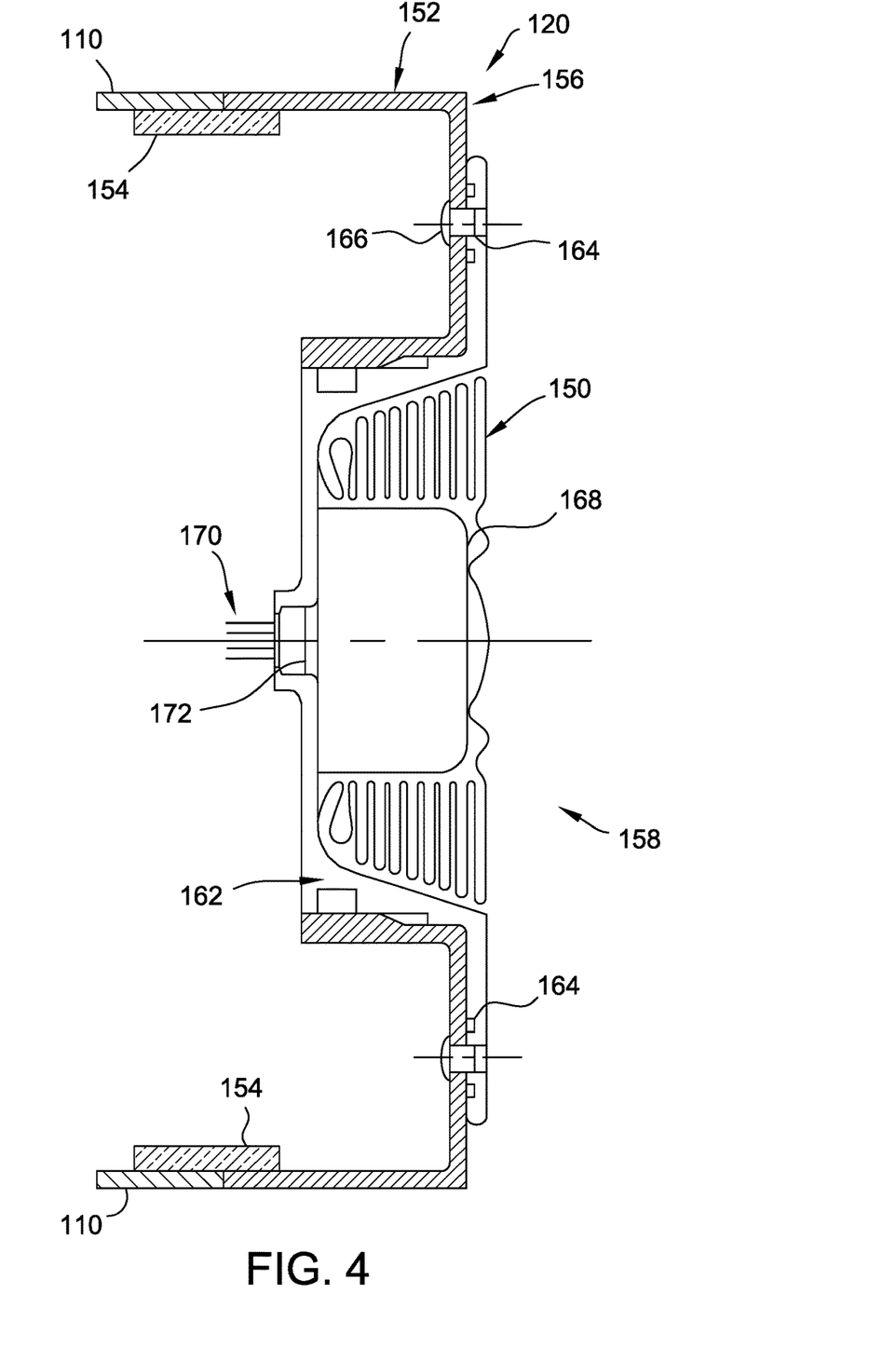
FIG. 4 is a cross-sectional view of an example tailcone assembly in a collapsed configuration that may be used with the hypersonic munition shown in FIG. 2.
Figure 5:
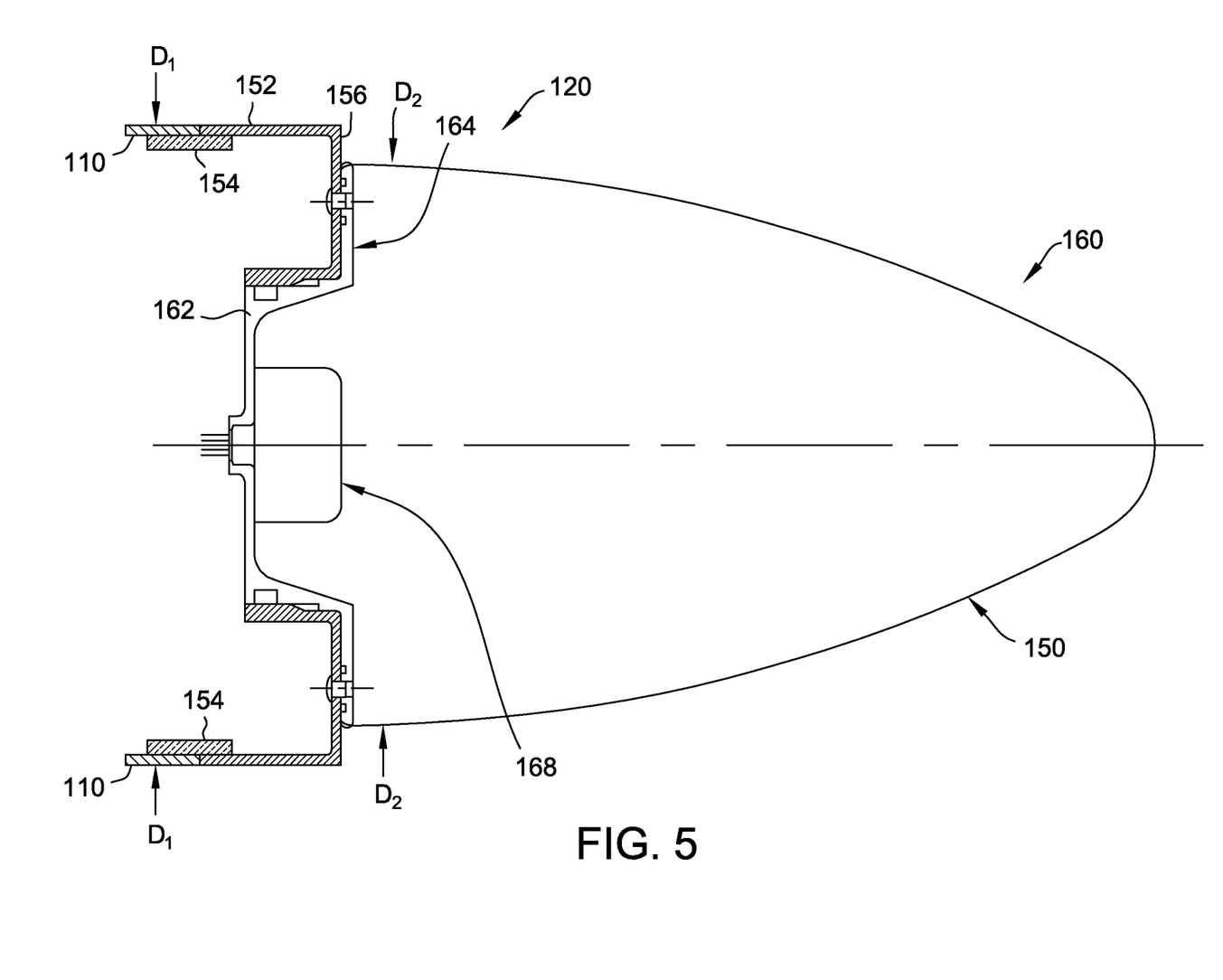
FIG. 5 is cross-sectional view of an example tailcone assembly in a deployed configuration that may be used with the hypersonic munition shown in FIG. 2.

FIG. 4 is a cross-sectional view of tailcone assembly 120 in a collapsed configuration 158, and FIG. 5 is cross-sectional view of tailcone assembly 120 in a deployed configuration 160. Housing 152 is connected to munition body 110 via collar 154 that spans the joint between body 110 and housing 152. Furthermore, housing 152 defines a cavity 162 which houses tailcone 150 in the collapsed configuration 158. In the example implementation, tailcone 150 is attached to housing 152 at a pair of pressure seals 164 using a fastener 166 that extends through housing 153. Alternatively, tailcone 150 may be attached to housing 152 in any manner that facilitates operation of tailcone assembly 120 as described herein. Tailcone assembly 120 also includes a pressure vessel 168 positioned within cavity 162 of housing 152 such that pressure vessel 168 activates to deploy tailcone 150 to the deployed configuration 160 upon receiving a signal from control system 122 indicative of a predetermined parameter. Specifically, in one implementation, control system 122 sends a charge through a plurality of electrical leads 170 and triggers a pyrotechnical charge 172 to activate pressure vessel 168. Alternatively, pressure vessel 168 is activated in any manner that facilities operation of tailcone assembly 120 as described herein.

As described herein, pressure vessel 168 is activated upon receiving a signal from control system 122 indicative of a predetermined parameter. In the example implementation, the predetermined parameter is a predetermined amount of time after deployment of munition 102 from aerial vehicle 100. Such time is measured from a discontinuation of a n electrical connection between munition 102 and vehicle 100. Specifically, a timer in control system 122 begins upon disconnection of munition 102 and allows munition to fall away from vehicle 100 for a predetermined amount of time before activating pressure vessel 168 and deploying tailcone 150. In another implementation, the activation signal could be received by control system 122 from an impulse sensor that senses the increased airflow once munition 102 is released, or from a temperature sensor to sense a change in temperature that indicates a change in speed or altitude of munition 102.

Upon activation, pressure vessel 168 rapidly inflates tailcone 150 with high pressure air and causes tailcone 150 to inflate from the collapsed configuration 158 to the deployed configuration 160. Pressure seals 164 maintain the pressure within tailcone 150 such that air is not continuously pumped or channeled into tailcone 150 to maintain the deployed configuration 160. Such rapid inflation requires tailcone 150 to be formed from a flexible, yet strong material that is non-permeable to air. In one implementation, tailcone 150 is formed from a composite material, such as but not limited to, Kevlar. The material of tailcone 150 must not only withstand the forces of rapid inflation and potentially extreme exterior environment munition flies through, but also maintain the tailcone's 150 desired shape for aerodynamic benefit. As shown in FIG. 5, munition body 110 includes a body diameter D1 proximate housing 152, and tailcone 150 defines a maximum tailcone diameter D2 that is smaller than body diameter D1 of munition body 110. As such, tailcone 150 does not extend radially beyond munition body 110 in the deployed configuration 160 such that tailcone 150 does not increase the drag on munition 102. In fact, as described herein, tailcone 150 provides a surface onto which air to flow after passing over end 156 and therefore reduces turbulence and drag.

Figure 6:
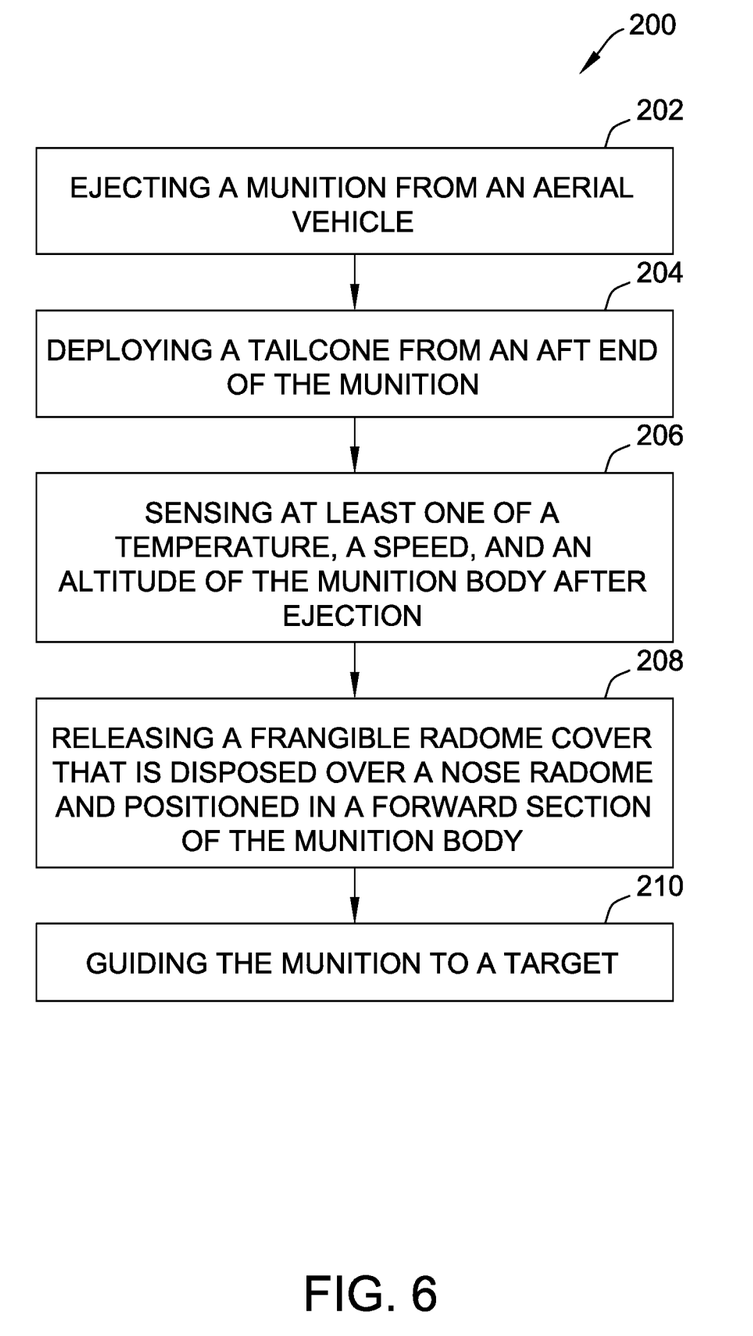
FIG. 6 is flow diagram of an example method of launching the hypersonic munition shown in FIG. 2 from the aerial vehicle shown in FIG. 1.

FIG. 6 is flow diagram of an example method 200 of launching the hypersonic munition 102 from aerial vehicle 100. Method 200 includes ejecting 202 the munition 102 from aerial vehicle 100. As described herein, munition 102 includes munition body 110 that is free of any propulsion system for producing thrust such that munition body 110 is incapable of producing active propulsion for imparting thrust to the munition 102. Specifically, munition 102 is ejected in an aftward direction through open door 106 of munitions bay 104 by launching system 108. Method 200 also includes deploying 204 tailcone assembly 120 from aft end 156 of munition 102 after ejecting munition 102 from vehicle 100. As described above, in the deployed configuration 160, tailcone assembly 120 reduces aerodynamic drag caused by airflow over aft end 156 of munition 102. The deploying step 204 further includes sensing an amount of time after ejection of the munition 102 and then deploying 204 the tailcone assembly 120 after a predetermined amount of time has elapsed from ejection 202 of the munition 102. The time is measured from a discontinuation of an electrical connection between vehicle 100 and munition 102.

Method 200 also includes sensing 206 at least one of a temperature, a speed, and an altitude of the munition body 110 after ejection 202 from the aerial vehicle 100 and releasing 208 frangible radome cover 140 upon detection by control system 122 that at least one of the sensed temperature, speed, and altitude has reached at least one of the predetermined speed, a predetermined altitude, and a predetermined temperature. As described herein, radome cover 140 is positioned in forward section 112 of munition 102 over radome 138 and shields radome 138 from high temperatures resulting from aerodynamic heating at hypersonic speeds. The sensing step 206 includes sensing the temperature of an outer surface of munition body 110, wherein the sensed temperature is indicative of speed of munition 102, and then determining, based on the sensed temperature, when munition 102 has decelerated to less than a predetermined speed at which to cause frangible radome cover 140 to be detached from munition 102. Alternatively, or in addition to, the sensing step 206 may include sensing at least one of the speed or the altitude of munition 102, and determining, based on the sensed speed or altitude, when munition 102 has decelerated to less than a predetermined speed or fallen to a predetermined altitude at which to cause the frangible radome cover 140 to be detached from munition 102. In the example implementation, method 200 also includes guiding munition 102 to the target by activating avionics system 134 to acquire the target and controlling the movable fins 130 to direct munition 102 toward the target without using any additional thrust.

The implementations described herein relate to aerial vehicles, and more specifically, to hypersonic aerial vehicles that are free of a propulsion system and can be used for air-to-air and air-to-ground targeting. The munition delivers kinetic energy to a target without requiring an independent propulsion system. Specifically, the munition is launched from the aerial vehicle at a sufficient hypersonic speed and altitude so that the aerial vehicle imparts a hypersonic initial speed to the munition such that the munition does not require a propulsion system. The release of the munition at hypersonic speeds results in a very high initial energy that allows the munition to perform both air-to-air and air-to-ground missions without the need for additional propulsion. The initial hypersonic speed of munition provides sufficient energy to not require acceleration to meet or exceed the speed of an air-to-air mission target. Further, the high initial energy provides sufficient range for air-to-ground engagement. Additionally, the ability of the munition to be used for both air-to-air and air-to-ground targeting improves mission effectiveness.

Furthermore, the frangible radome cover shields the radome and other munition components from high temperatures resulting from aerodynamic heating at hypersonic speeds as the munition travels through the air at a high velocity toward an intended target destination. Additionally, the tailcone assembly reduces aerodynamic drag caused by the airflow over a blunt aft end of the munition. Specifically, the tailcone reduces vortex and eddy current formation at the aft end and allows for a more laminar boundary layer as the airflow transitions from the end to the tailcone. Such reduction in drag increases the stability and range of the munition.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A propulsionless munition configured to be launched from a hypersonic aerial vehicle, comprising:
   a munition body that is free of any propulsion system for producing thrust, the munition body comprising a forward section including a radome assembly, and an aft section comprising a control system; and
   wherein the radome assembly comprises:
   a nose radome; and
   a frangible radome cover disposed over the nose radome, wherein the frangible radome cover is detachable from the nose radome upon detection by the control system of a predetermined threshold comprising at least one of a predetermined altitude or a predetermined temperature.

2. The propulsionless munition of claim 1, wherein the munition is configured to be launched from an airborne hypersonic aerial vehicle so that the airborne hypersonic aerial vehicle carrying the munition imparts a hypersonic initial speed to the munition, such that the munition does not require a propulsion system.

3. The propulsionless munition of claim 1, wherein upon launch from the hypersonic aerial vehicle the control system monitors a temperature of the munition and causes the frangible radome cover to detach from the munition upon detecting a temperature less than the predetermined temperature.

4. The propulsionless munition of claim 1, wherein the frangible radome cover has a shape corresponding to the nose radome and is detachable by a detonation cord that is activated by the control system upon detection by the control system of the predetermined threshold.

5. The propulsionless munition of claim 4, further comprising a plurality of movable fins and a targeting system communicatively coupled to the control system such that once the control system causes the frangible radome cover to be detached, the control system uses the targeting system to guide the munition via control of the plurality of moveable fins towards a target.

6. The propulsionless munition of claim 4, wherein the frangible radome cover comprises an outer layer of a ceramic material and an inner layer of a metallic material, wherein the outer layer is configured to erode away from the inner layer, and wherein the inner layer is configured to be detached by the detonation cord.

7. The propulsionless munition of claim 1, wherein the predetermined threshold further comprises a predetermined speed, the munition further comprising a sensor for monitoring a temperature on an outer surface of the munition that is indicative of a speed of the munition, wherein the control system determines, based on the sensed temperature, when the munition has decelerated to less than the predetermined speed at which to cause the frangible radome cover to be detached from the munition.

8. The propulsionless munition of claim 7, wherein the predetermined speed at which the control system is configured to cause the frangible radome cover to detach is a speed not more than 75 percent of an initial speed of the munition after ejection from the hypersonic aerial vehicle.

9. The propulsionless munition of claim 1, wherein upon launch from the hypersonic aerial vehicle the control system monitors an altitude of the munition and causes the frangible radome cover to detach from the munition upon detecting an altitude less than the predetermined altitude.

10. The propulsionless munition of claim 1, further comprising a deployable tailcone assembly for deployment from the aft section upon launch of the munition, wherein the deployable tailcone assembly reduces aerodynamic drag caused by airflow over a blunt aft end of the munition.

11. The propulsionless munition of claim 10, wherein the deployable tailcone assembly comprises:
   a tailcone housing connected to the munition body and defining a cavity;
   a deployable tailcone attached to the tail housing and positioned within the cavity in a stored configuration; and
   a pressure vessel positioned within the tailcone housing and configured to deploy the tailcone to a deployed configuration upon receiving a signal from the control system indicative of a predetermined parameter.

12. The propulsionless munition of claim 11, wherein the tailcone comprises a tailcone diameter in the deployed configuration that is smaller than a body diameter of the munition body.

13. A method of launching a propulsionless munition from a hypersonic aerial vehicle, comprising:
   ejecting the munition from the aerial vehicle, wherein the munition includes a munition body that is free of any propulsion system for producing thrust such that the munition body is incapable of producing active propulsion for imparting thrust to the munition;
   sensing at least one of a temperature or an altitude of the munition body after ejection from the aerial vehicle; and
   releasing a frangible radome cover that is disposed over a nose radome and positioned in a forward section of the munition body upon detection by a control system that at least one of the sensed temperature or altitude has reached a predetermined threshold.

14. The method of claim 13, wherein the sensing step comprises:
   sensing a temperature on an outer surface of the munition, wherein the temperature is indicative of a speed of the munition; and
   determining, based on the sensed temperature, when the munition has decelerated to less than a predetermined speed at which to cause the frangible radome cover to be detached from the munition.

15. The method of claim 13, wherein the sensing step further comprises:
   sensing the speed; and
   determining, based on the sensed speed, when the munition has decelerated to less than a predetermined speed at which to cause the frangible radome cover to be detached from the munition.

16. The method of claim 13, further comprising deploying a tailcone assembly from an aft end of the munition after ejecting the munition, wherein the tailcone assembly reduces aerodynamic drag caused by airflow over a blunt aft end of the munition.

17. The method of claim 16, wherein deploying the tailcone assembly comprises sensing an amount of time after ejection of the munition and deploying the tailcone assembly after a predetermined amount of time has elapsed from ejection of the munition.

18. The method of claim 17, wherein the predetermined amount of time is measured from a discontinuation of an electrical connection between the aerial vehicle and the munition.

19. The method of claim 13, further comprising:
   activating an avionics system after the frangible radome cover is released;
   acquiring a target using the avionics system; and
   controlling a plurality of moveable fins attached to the munition body using a control system to direct the munition to the target without using any additional thrust.

20. The method of claim 13, wherein ejecting the munition comprises opening a bay door and ejecting the munition in an aftward direction.

* * * * *